April 27, 1965   S. H. LASSEN   3,180,738
TREATMENT OF PRECOOKED FISH
Filed Dec. 12, 1962

SVEN LASSEN
INVENTOR.

3,180,738
TREATMENT OF PRECOOKED FISH
Sven H. Lassen, Los Angeles, Calif., assignor to Ralston Purina Company, St. Louis, Mo., a corporation of Missouri
Filed Dec. 12, 1962, Ser. No. 244,095
14 Claims. (Cl. 99—111)

My invention relates to an improved method of cooling precooked fish and holding them prior to canning. My new method can be termed aseptic anaerobic cooling, and is particularly useful for canning tuna and tuna-like fishes. Such fishes include albacore, bluefin, bonito, skipjack, yellowfin, and yellowtail, and in this specification the term "tuna" is intended to include all these fish.

A typical tuna-packing plant is located near a dock where vessels can unload the fish, which are generally in a partially thawed condition. After the thawing process has been completed, the fish are eviscerated and are placed in wire baskets. The baskets are loaded onto wheeled racks, and the racks are rolled into a precooker, a type of steam autoclave, usually rectangular and able to hold several racks. There the fish are precooked by steam under slightly-above atmospheric pressure between about 212° and 220° F. The steps so far described are retained in the present invention.

Heretofore, the precooking operation has been followed by moving the racks out of the precooker into a cooling room, a large room usually held at ambient temperature and humidity. There are fish have been left to cool to a temperature where they could be handled by hand, and were firm enough to be cleaned. This prior-art cooling process usually has taken about twelve to twenty-four hours, but it has often been followed by a one to three day wait.

After cooling, whether by this prior-art process or by the method of this invention, the fish can be taken into another portion of the plant, cleaned, the head removed, and the skin and fins scraped off. The fish is then split, the backbone removed, each half split again longitudinally and the dark meat carefully scraped away. Four large longitudinal muscles called loins are then cut to can size, packed in cans, and the cans are closed. Subsequently, the cans and their contents are sterilized by retorting.

The above-described conventional method of cooling the precooked tuna had many drawbacks. For one thing, the surface of the meat turned brown during cooling, resulting in a dark pellicle, which had to be removed, for it is important that the canned fish meat be white or light color. However skillfully the brown meat was scraped away, the operation not only reduced the yield of usable meat but also added to the labor cost.

Another problem resulting from the prior art method of cooling the precooked fish was the dehydration of the meat, for much of the water in the natural fish juices—possibly 5 to 12% of the total water content of the meat—was lost.

A third problem was that, even under optimum conditions, the cooling room could not be maintained truly sanitary. Mold and bacteria got on the fish and grew there, causing off-color and off-taste effects.

Partly because the temperature and humidity within the cooling room changes under varying atmospheric conditions, it is extremely difficult to schedule the cooling of the fish so that the fish can be sent to the cleaning and packing operations as soon as the precooked fish is cool. Hence, considerable deterioration in meat quality took place during cooling.

Recent work at various universities emphasizes the catalytic action that certain fractions of the tuna muscle protein have on the oxidation of its highly unsaturated fatty constituents. Oxidation is particularly strong in the cooked tuna meat, and one purpose of my invention is to prevent such oxidation.

An important object of the present invention is to solve all the above-described problems, which are disadvantages of the conventional method of cooling tuna fish after precooking and before canning, in other words, to cook and cool the tuna in such a fashion that good sanitation is maintained, bacterial invasion is prevented, oxidation of the various oxidizable foods, such as the fat constituents as well as protein constituents, is avoided, and dehydration is prevented or reduced.

Another object of the invention is to eliminate the cooling room. In existing plants such space can be readily converted to a more productive use.

Attempts to solve these problems have been made, but, heretofore, none has done so satisfactorily. One such attempt was to let the fish cool in the precooking autoclave while preventing the entry of air thereto. However, the cooling of the hot steam resulted in vacuum conditions which the present-day tuna-fish cookers were unable to withstand without collapse. Moreover, the fish meat, being hotter at the center and at a higher pressure there, tended to explode and disintegrate. Furthermore, moisture was carried off during such cooling. An unfortunate misunderstanding of these problems led to attempts to reduce the pressure in the cooker still lower by pulling a vacuum thereon down to a pressure of only about ½ p.s.i.a. This led merely to an aggravation of the situation. In fact, there are no tuna-fish cookers in use presently capable of withstanding atmoshperic pressure on the outside and these low pressures inside. To make them heavy enough and strong enough to do so would be expensive and would waste large amounts of heat when heating and cooling the cookers.

Another object of this invention is to cool precooked fish before canning by a method which can use existing equipment by effecting only slight and comparatively inexpensive modification of the equipment.

An additional object is to cool precooked fish more quickly than can be done by the prior art methods.

A further object is to provide a method of preparing fish for canning which appreciably raises the yield of usable meat as compared to existing methods.

Another object of the invention is to reduce the likelihood of the formation of struvite in canned tuna, struvite being a crystal that tends to form in canned tuna after canning. The crystals look like glass and have caused considerable trouble in the tuna industry, not because they are actually dangerous, but because the people opening cans containing struvite are convinced that the canner has carelessly let broken glass get into the food.

Briefly, my invention includes cooling the precooked fiish in the cooker while holding the pressure therein at approxiamtely atmospheric and while preventing the access thereto of oxygen, by admitting to the cooker inert gas in quantity sufficient to hold the pressure in the cooker above atmospheric. The invention rests partly on my discovery that the discoloration and degradation result from oxidation, partly on my discovery that the other degradation, including the growth of mold and bacteria, can be prevented by the substantial exclusion of oxygen from the cooker, and partly on the fact that carbon dioxide gas, used as the "inert" gas or in the inert gas may enhance the quality of the fish meat.

Other objects and advantages will become apparent from the following description of some preferred forms of the invention.

Figure 1:
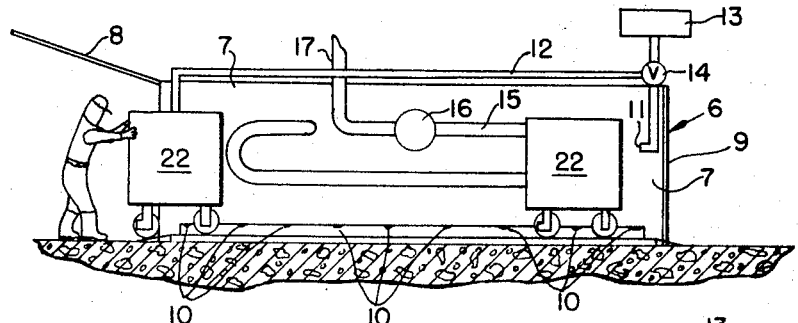
FIG. 1 is a somewhat diagrammatic view in side elevation of a cooker suitable for precooking and later cooling fish in accordance with the principles of the present invention; the cooker is shown while it is being loaded before cooking.

The present invention may be practiced with an autoclave or cooker 6 that provides combination precooking and cooling chamber 7. The chamber 7 may be generally rectangular with a loading door 8 at one end and an unloading door 9 at the other end. The chamber 7 may be supplied with cooking steam by conventional steam nozzles 10 in communication with a suitable source of steam (not shown). The chamber 7 is also provided with one or more gas inlets 11 that are used during the cooling and are connected by a conduit 12 to a supply 13 of inert gas (e.g., nitrogen or argon) under pressure. Carbon dioxide may be used or may be mixed with an inert gas such as nitrogen or argon, and the inert gas may comprise most of the gas mixture, even with a relatively small amount of carbon dioxide, in order to attack the struvite problem. In the conduit 12 may be a pressure-sensitive valve 14. For cooling a heat exchanger 15 and a circulating fan 16 are helpful. During the cooling step, but not during the cooking step, cold fluid from a conduit 17 goes to the heat exchanger 15, returning, if desired, to an evaporator and condenser or other type of cooling apparatus (not shown).

Figure 3:
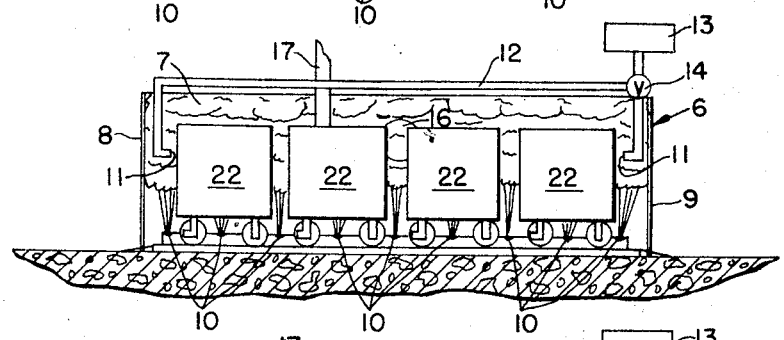
FIG. 3 is a view like FIG. 1 showing the doors to the cooker closed and the precooking step being performed.
Figure 2:
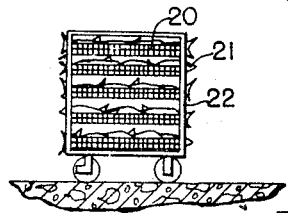
FIG. 2 is an enlarged view in side elevation of a fish-holding rack of a type that may be used to hold the fish in the cooker.

As shown in FIGS. 1 and 2, fish 20 may be placed in wire baskets 21 that are loaded upon wheeled racks 22, and the loaded racks 22 moved into the chamber 7 through the door 8, the unloading door 9 being closed. When enough fish have been put into the chamber 7, the loading door 8 is closed, so that both doors are shut (see FIG. 3), and the interior of the chamber 7 is then substantially isolated from the atmosphere. Then steam is admitted to the chamber 7 through the nozzles 10, raising the temperature within the chamber 7 to about 212° to 220° F. The time required for precooking varies in accordance with the size and quantity of the fish being processed, but usually lies between three and ten hours.

Figure 4:
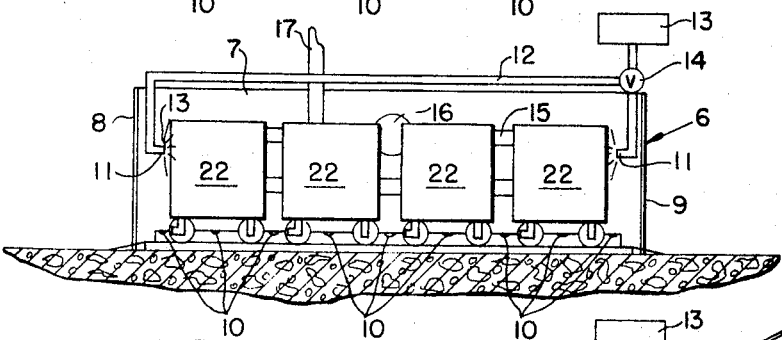
FIG. 4 is a view like FIG. 3 showing the cooker during the cooling step of this invention.
Figure 5:
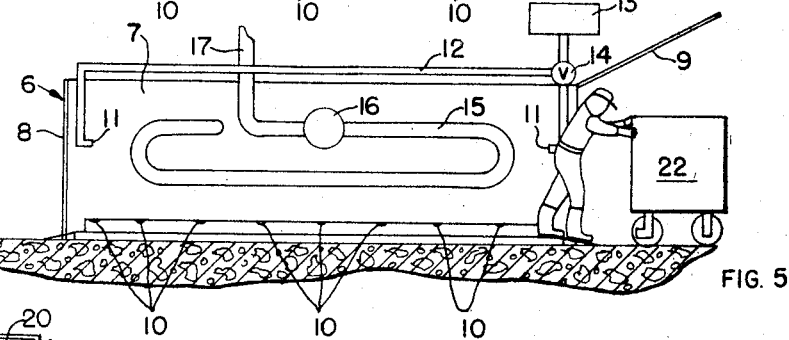
FIG. 5 is a view like FIG. 4, showing how the cooker may be unloaded.

When precooking is completed, the flow of steam into the chamber 7 is cut off. Then (see FIG. 4), the chamber 7 is cooled, either by simply waiting while the heat is dissipated through the walls of the cooker into the atmosphere, or preferably, by use of the cooling system with its heat exchanger 15. The cooling of the chamber 7 results in reducing the pressure therein, and there is a tendency for vacuum conditions to develop. However, the present invention includes the valve 14, which, before the chamber 7 drops below atmospheric, admits carbon-dioxide-containing gas or inert gas without carbon dioxide, such as nitrogen, into the chamber 7 through the nozzles 11. Since the relative humidity remains at 100, there is little evaporation, and most of the moisture present within the fish 20 is retained therein.

When carbon dioxide is the "inert" gas or is in the gas coming in through the inlets 11, it tends to lower the pH of the fish slightly and thereby helps to prevent the formation of struvite later on after the fish has been canned. If desired, the carbon dioxide gas or the inert gas may be blended with other suitable gases, such as a suitable reducing gas (e.g., hydrogen, sulfur dioxide, or nitrous oxide), in addition to nitrogen or other inert gas, if approved by the Food and Drug Administartion, to enhance the color of the meat.

In practice, assuming the pressure within the cooker approximates 16 p.s.i.a. at the end of precooking and the beginning of the cooling period, that pressure will drop only slightly, if any, below atmospheric before the gas is admitted; so it remains at substantially atmospheric or slightly higher at the end of such period. The temperature during this time drops from approximately 218° F. to preferably a temperature of about 80° F. The time required for this cooling generally lies between one to four hours, and during this time the cooker remains sterile and anaerobic. The time at which the fish are to be removed from the precooking and cooling chamber 7 can be adjusted to the schedule of the cleaning and packing personnel, thereby avoiding costly overtime. They can be stored there over the week end, if desired. At the proper time, the unloading door 9 is opened and the wheeled racks 22 are removed from the chamber 7 and transferred directly to the cleaning room.

My method results in a considerable reduction in discoloration of the fish during the cooling period, primarily because of the prevention of oxidation. Also less water is lost. Since the discoloration of the meat of the fish is at a minimum and since less water is lost, the percentage of yield is appreciably increased. Additionally, the costly hand scraping ordinarily required to remove such discolored pellicle is eliminated and the skin does not have to be scraped off, but can be peeled off. Since the humidity within the precooking and cooling chamber 7 is maintained at the desired 100 relative humidity, the water in natural fish juices will not be subject to evaporative losses during the cooling period. It has also been determined that the fish loins are considerably firmed as compared to the existing methods, and accordingly, the cleaning and packing operations are facilitated.

Although the aforedescribed method of the present invention has been described in connection with the preparation of tuna and tuna-like fish for canning, it will be apparent that it may also be applicable to the canning of other types of fish. It will likewise be apparent that various modifications and changes may be made with respect to the foregoing detailed description without departing from the spirit of the invention or the scope of the following claims.

I claim:

1. A method of cooling tuna-like fish that have been precooked in a precooking zone preparatory to canning which includes leaving said fish in the precooking zone, maintaining substantial isolation of said zone from the atmosphere, placing said zone in communication with a source of inert gas to maintain said zone substantially oxygen-free and adding said gas in quantity sufficient to maintain the pressure at atmospheric level while effecting cooling of the zone to a desired temperature.

2. A method of cooling precooked tuna-like fish preparatory to canning said fish having been precooked in an oven that is substantially isolated from the atmosphere and filled with steam, comprising the steps of cooling said zone while maintaining it substantially oxygen-free and adding to said zone inert gas in quantity sufficient to maintain the pressure at substantially atmospheric level during cooling of the zone.

3. A method of anaerobic cooling of precooked tuna preparatory to canning which includes maintaining said fish after precooking in a zone that is substantially isolated from the atmosphere and filled with steam, and cooling said zone while maintaining it substantially oxygen-free and adding inert gas in quantity sufficient to maintain the pressure at approximately atmospheric level during the cooling of the zone to a desired temperature.

4. The method of claim 3 in which said inert gas also contains a reducing gas.

5. A method of cooling tuna-like fish that have been precooked in a precooking zone preparatory to canning which includes leaving said fish in the precooking zone, maintaining substantial isolation of said zone from the atmosphere, placing said zone in communication with a source of inert gas to maintain said zone substantially oxygen-free and adding said inert gas in quantity suf- 6. A method of cooling precooked tuna-like fish preparatory to canning said fish having been precooked in an oven that is substantially isolated from the atmosphere and filled with steam, comprising the steps of cooling said zone while maintaining it substantially oxygen-free and adding to said zone inert gas in quantity sufficient to maintain the pressure at substantially atmospheric level during cooling of the zone.

7. A method of anaerobic cooling of precooked tuna preparatory to canning which includes maintaining said fish after precooking in a zone that is substantially isolated from the atmosphere and filled with steam, and cooling said zone while maintaining it substantially oxygen-free and adding inert gas in quantity sufficient to maintain the pressure at approximately atmospheric level during the cooling of the zone to a desired temperature.

8. A method of cooling tuna-like fish that have been precooked in a precooking zone preparatory to canning which includes leaving said fish in the precooking zone, maintaining substantial isolation of said zone from the atmosphere, placing said zone in communication with a source of carbon-dioxide containing inert gas to maintain said zone substantially oxygen-free and adding said gas in quantity sufficient to maintain the pressure at atmospheric level while effecting cooling of the zone to a desired temperature.

9. A method of cooling precooked tuna-like fish preparatory to canning said fish having been precooked in an oven that is substantially isolated from the atmosphere and filled with steam, comprising the steps of cooling said zone while maintaining it substantially oxygen-free and adding to said zone inert gas in quantity sufficient to maintain the pressure at substantially atmospheric level during cooling of the zone, said gas containing carbon dioxide.

10. A method of anaerobic cooling of precooked tuna preparatory to canning which includes maintaining said fish after precooking in a zone that is substantially isolated from the atmosphere and filled with steam, and cooling said zone while maintaining it substantially oxygen-free and adding inert, carbon-dioxide-containing gas in quantity sufficient to maintain the pressure at approximately atmospheric level during the cooling of the zone to a desired temperature.

11. The method of claim 10 in which said inert gas also contains a reducing gas.

12. A method of cooling tuna-like fish that have been precooked in a precooking zone preparatory to canning which includes leaving said fish in the precooking zone, maintaining substantial isolation of said zone from the atmosphere, placing said zone in communication with a source of carbon dioxide gas to maintain said zone substantially oxygen-free and adding said carbon dioxide gas in quantity sufficient to maintain the pressure at atmospheric level while effecting cooling of the zone to a desired temperature.

13. A method of cooling precooked tuna-like fish preparatory to canning said fish having been precooked in an oven that is substantially isolated from the atmosphere and filled with steam, comprising the steps of cooling said zone while maintaining it substantially oxygen-free and adding to said zone carbon dioxide gas in quantity sufficient to maintain the pressure at substantially atmospheric level during cooling of the zone.

14. A method of anaerobic cooling of precooked tuna preparatory to canning which includes maintaining said fish after precooking in a zone that is substantially isolated from the atmosphere and filled with steam, and cooling said zone while maintaining it substantially oxygen-free and adding carbon dioxide gas in quantity sufficient to maintain the pressure at approximately atmospheric level during the cooling of the zone to a desired temperature.

References Cited by the Examiner
UNITED STATES PATENTS

| 1,938,522 | 12/33 | Grayson | 99—192 XR |
| 2,919,987 | 1/60 | Erickson et al. | 99—195 XR |
| 2,955,940 | 10/60 | Williams | 99—189 XR |

A. LOUIS MONACELL, *Primary Examiner.*